United States Patent [19]
Kim et al.

[11] Patent Number: 5,735,476
[45] Date of Patent: Apr. 7, 1998

[54] REEL DRIVING APPARATUS FOR MAGNETIC RECORDING AND REPRODUCING APPARATUS

[75] Inventors: Tae Hyung Kim, Seoul; Yong Sang Lee, Kyungki-Do, both of Rep. of Korea

[73] Assignee: LG Electronics Inc., Seoul, Rep. of Korea

[21] Appl. No.: 785,510

[22] Filed: Jan. 17, 1997

[30] Foreign Application Priority Data

Jan. 19, 1996 [KR] Rep. of Korea ............ 1133/1996

[51] Int. Cl.⁶ .................................................. G11B 15/44
[52] U.S. Cl. ........................... 242/356.3; 242/356.5; 242/356.7
[58] Field of Search ............... 242/356, 356.3, 242/356.5, 356.7; 360/96.4

[56] References Cited

U.S. PATENT DOCUMENTS

| | | | |
|---|---|---|---|
| 3,976,263 | 8/1976 | Suzuki | 242/356.7 |
| 5,251,845 | 10/1993 | Ryu | 242/356.3 |
| 5,501,408 | 3/1996 | Kang et al. | 242/356.5 |

Primary Examiner—John P. Darling
Attorney, Agent, or Firm—Birch, Stewart, Kolasch & Birch, LLP

[57] ABSTRACT

An improved reel driving apparatus for a magnetic recording and reproducing apparatus which is capable of simplifying the construction of a reel mechanism which requires different rotation torques of normal and reverse rotation directions. The apparatus includes a reversible motor, a transmission gear which is inserted onto a shaft between a supply reel and a take-up reel and is rotatable by a rotational force from the reversible motor, a slip mechanism having an input gear drivingly connected with the transmission gear and an output gear having a pair of gear portions, with the input gear receiving the rotational force from the input gear through a friction member, a lifting and lowering gear having a pair of gear portions, which are selectively connected with the gear portions of the output gear by a lifting and lowering member, and being rotated, lifted, and lowered with respect to the shaft, and an idler gear which is always connected with the lifting and lowering gear for selectively transferring a rotational force from the lifting and lowering gear to one of supply and take-up reels.

11 Claims, 3 Drawing Sheets

REEL DRIVING APPARATUS FOR MAGNETIC RECORDING AND REPRODUCING APPARATUS

BACKGROUND OF THE INVENTION

1. Field of the Invention

The present invention relates to a reel driving apparatus for a magnetic recording and reproducing apparatus, and in particular to an improved reel driving apparatus for a magnetic recording and reproducing apparatus which is capable of simplifying the construction of a reel mechanism which requires different rotation torques of normal and reverse rotation directions.

2. Description of the Conventional Art

FIG. 1 is a plan view illustrating a tape running system and a reel driving apparatus of a conventional magnetic recording and reproducing apparatus, FIG. 2 is a cross-sectional view illustrating a conventional reel driving apparatus in the reproducing mode, and FIG. 3 is a cross-sectional view illustrating a conventional reel driving apparatus in the fast winding mode.

As shown therein, a tape T is released from a tape cassette (not shown) in cooperation with a take-up reel 1' and is wound onto a head drum 3 through a plurality of guide members P0, P1, and P2 and a full-width erasing head 2. Video and audio signals are reproduced from the tape T by a head (not shown) of a head drum 3, and then the tape T is wound in the tape cassette through a plurality of guide members P3, P4, and P5 and an audio control head 4.

In addition, in order to supply or take-up the tape in the above-described manner, a supply reel 1 and a take-up reel 1' are driven.

The construction of the supply and take-up reels 1 and 1' will now be explained.

The mechanism of the supply and take-up reels 1 and 1' includes a capstan motor 5, a pulley 8 having a pulley gear 8-1 for receiving the rotation force of the capstan motor 5 through a belt 7, and an intermediate gear 9 having a big gear 9-1 and a small gear 9-2. In addition, a clutch assembly 10 is disposed for receiving the rotation force of the big gear 9-1 intermeshed with the pulley gear 8-1 through the small gear 9-2 and for transferring a predetermined torque in cooperation with the slip of a slip member 10P, and a lifting and lowering gear 11 is disposed for receiving the rotation force of the intermediate gear 9 intermeshed with the clutch assembly 10 through a big gear 11-1 and receiving the rotation force of the intermediate gear 9 intermeshed with the engaging protrusion 11', and an idler gear 12 is intermeshed with a small gear 11-2 of the lifting and lowering gear 11, receives the rotation force of the lifting and lowering gear 11, and selectively drives the take-up reel 1' and the supply reel 1.

In addition, the take-up reel 1' is driven by the idler gear 12, and the supply reel 1 is driven by a first transmission gear 13 intermeshed with the idler gear 12 and a second transmission gear 14 intermeshed with the first transmission gear 13. The first and second transmission gears 13 and 14 are used for driving the supply reel 1 which requires more rotation force rather than the take-up reel 1'.

The diameter of the second transmission gear 14 is greater than that of the first transmission gear 13, so that the rotation force of the idler gear 12 is decreased, and high torque is obtained and transferred to the supply reel 1.

In the drawings, reference numeral 5' denotes a capstan shaft, 6 denotes a pinch roller, 9' denotes an engaging protrusion of the intermediate gear 9, 10-1 denotes an input gear of the clutch assembly 10, 10-2 denotes an output gear of the clutch assembly 10, 10S denotes a spring, 11S denotes a spring, and 11' denotes an engaging protrusion of the lifting and lowering gear 11.

The operation of the conventional reel driving apparatus will now be explained with reference to the accompanying drawings.

First, in the reproducing mode (CUE and REV modes), as shown in FIG. 2, the rotation force of the capstan motor 5 is transferred to the pulley 8 through the belt 7, and the intermediate gear 9 intermeshed with the pulley gear 8-1 is rotated, for thus rotating the clutch assembly 10. The output gear 10-2 of the clutch assembly 10 causes slip in cooperation with the slip of the clutch assembly 10 and transfers the rotation force to the lifting and lowering gear 11. In addition, the idler gear 12 is rotated by the lifting and lowering gear 11 and drives the supply reel 1 and take-up reel 1', for thus performing the reproducing mode. In the above-described reproducing mode, the pinch roller 6 contacts with the capstan shaft 5', for thus running the tape T, and a constant rotation of the capstan shaft 5' is obtained by a servo circuit.

In the fast winding mode (FF and REW modes), as shown in FIG. 3, the lifting and lowering gear 11 is lowered by a lifting and lowering member 45 and is rotated together with the intermediate gear 9, for thus directly transferring the rotation force to the idler gear 12 not through the clutch assembly 10. Namely, the lifting and lowering gear 11 and the intermediate gear 9 are integrally rotated when the engaging protrusions 11' formed in the lower surface of the lifting and lowering gear 11 are engaged with the engaging protrusions 9' formed in the upper surface of the intermediate gear 9. Therefore, the driving force of the capstan motor 5 is transferred to the pulley 8 through the belt 7, and the pulley gear 8-1 formed in the pulley 8 drives the intermediate gear 9, and the lifting and lowering gear 11 which is integrally rotated together with the intermediate gear 9 drives the idler gear 12. When the idler gear 12 is rotated in the normal direction, the idler gear 12 drives the take-up reel 1', and when the idler gear 12 is rotated in the reverse direction, the idler gear 12 drives the supply reel 1, for thus performing the fast winding mode. In the fast winding mode, the tape T is run in a state that the pinch roller 6 is spaced-apart from the capstan shaft 5'.

In addition, when winding the tape T into the tape cassette, since the tape winding amount is different at beginning and end time of the tape running, the clutch assembly 10 causes slip and drives the supply reel 1 and the take-up reel 1' by using a constant torque.

However, the conventional reel driving apparatus for a magnetic recording and reproducing apparatus has the following problems.

First, the rotational torque of the take-up reel 1' when the capstan shaft 5' is rotated in the counterclockwise direction is higher than the rotational torque of the supply reel 1' when the capstan shaft 5' is rotated in the clockwise direction. Therefore, in the clutch assembly 10 of the conventional reel driving apparatus for a magnetic recording and reproducing apparatus, in order to increase the rotational torque of the supply reel 1 when running the tape T in the reverse direction, the first and second transmission gears 13 and 14 are disposed for reducing the running speed of the tape T.

In other words, in view of the running distance of the tape T, since the running distance from the capstan motor 5 to the supply reel 1 in the reverse rotation mode is longer than the running distance from the capstan motor 5 to the take-up reel 1' in the normal rotation direction, a greater torque is needed when rotating the supply reel 1 in the reverse direction. Therefore, the first and second transmission gears 13 and 14 are additionally necessary.

Since the first and second transmission gears 13 and 14 are additionally provided for obtaining a greater rotational torque when driving the supply reel 1, the number of parts are disadvantageously increased. In addition, since the first and second transmission gears 13 and 14 are additionally provided, the mechanism of the system becomes complicated, and the malfunction may easily occur.

SUMMARY OF THE INVENTION

Accordingly, it is an object of the present invention to provide a reel driving apparatus for a magnetic recording and reproducing apparatus which overcomes the aforementioned problems encountered in the conventional art.

It is another object of the present invention to provide an improved reel driving apparatus for a magnetic recording and reproducing apparatus which is capable of simplifying the construction of a reel mechanism which requires different rotation torques of normal and reverse rotation directions.

To achieve the above objects, in accordance with a first embodiment of the present invention, there is provided a reel driving apparatus for a magnetic recording and reproducing apparatus which includes a reversible motor, a transmission gear which is inserted onto a shaft between a supply reel and a take-up reel and is rotatable by a rotational force from the reversible motor, a slip mechanism having an input gear drivingly connected with the transmission gear and an output gear having a pair of gear portions, with the input gear receiving the rotational force from the input gear through a friction member, a lifting and lowering gear having a pair of gear portions, which are selectively connected with the gear portions of the output gear by a lifting and lowering member, and being rotated, lifted, and lowered with respect to the shaft, and an idler gear which is always connected with the lifting and lowering gear for selectively transferring a rotational force from the lifting and lowering gear to one of supply and take-up reels.

To achieve the above objects, in accordance with a second embodiment of the present invention, there is provided a reel driving apparatus for a magnetic recording and reproducing apparatus which includes a reversible motor, a transmission gear which is rotatable by the reversible motor, a lifting and lowering gear inserted onto a shaft disposed between a supply reel and a take-up reel, an idler gear for transferring a rotation force to the supply reel and the take-up reel, and a path change member for selecting one from first, second, and third rotation force transfer paths in which the transfer driving force is different, respectively, in accordance with the operation mode and for directly or indirectly transferring a rotational force from the transmission gear to the lifting and lowering gear.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
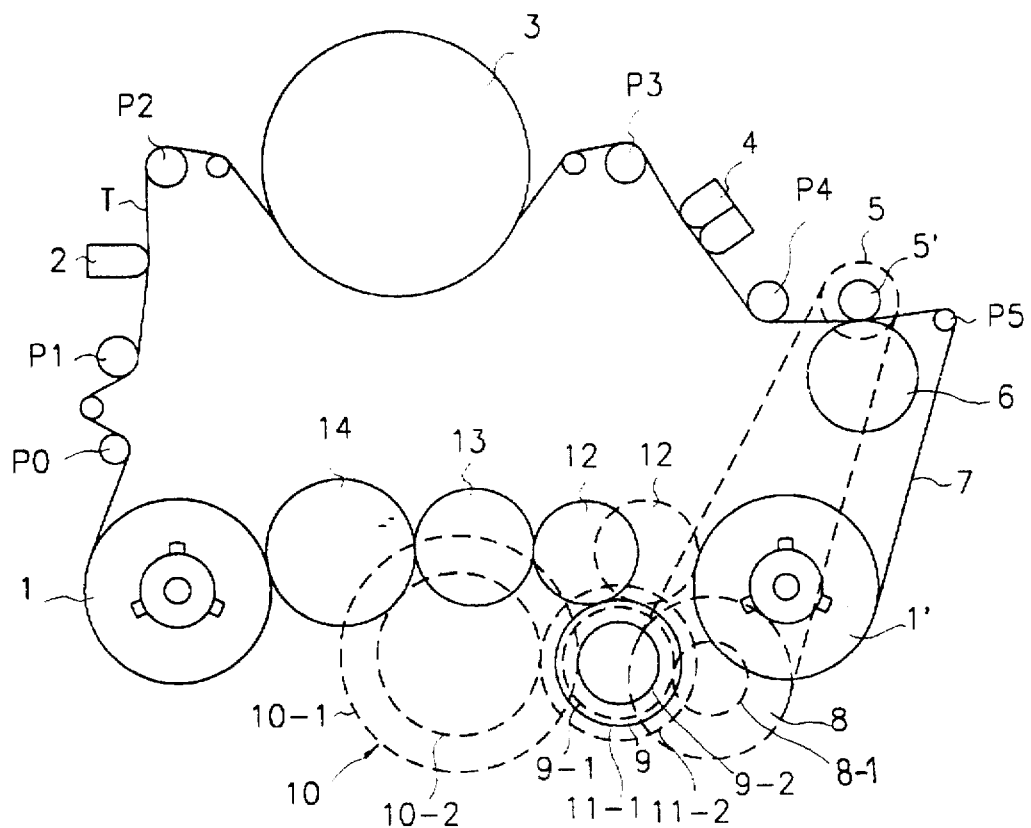
FIG. 1 is a plan view illustrating a tape running system and a reel driving apparatus of a conventional magnetic recording and reproducing apparatus.
Figure 2:
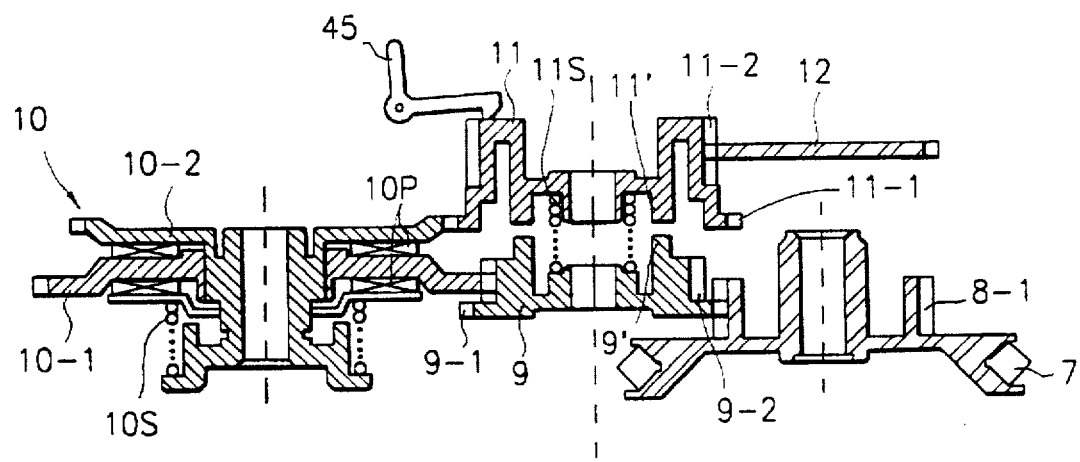
FIG. 2 is a cross-sectional view illustrating a conventional reel driving apparatus in the reproducing mode.
Figure 3:
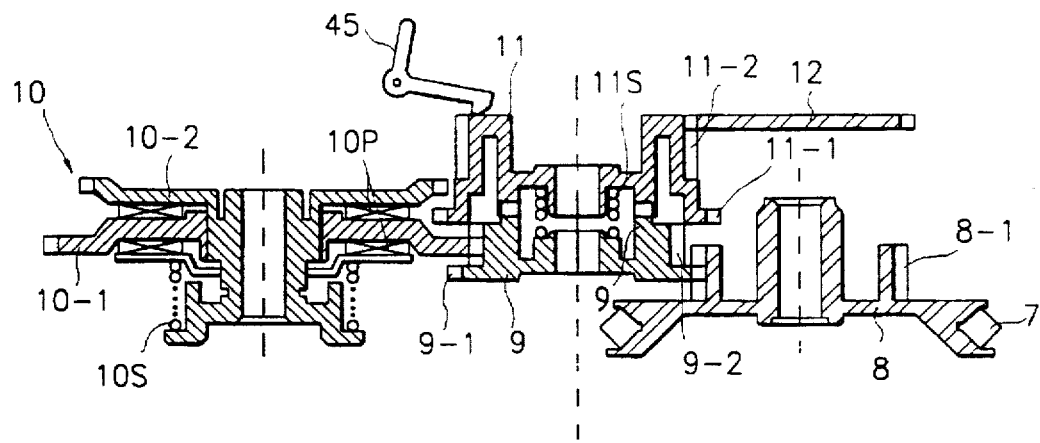
FIG. 3 is a cross-sectional view illustrating a conventional reel driving apparatus in the fast winding mode.
Figure 4:
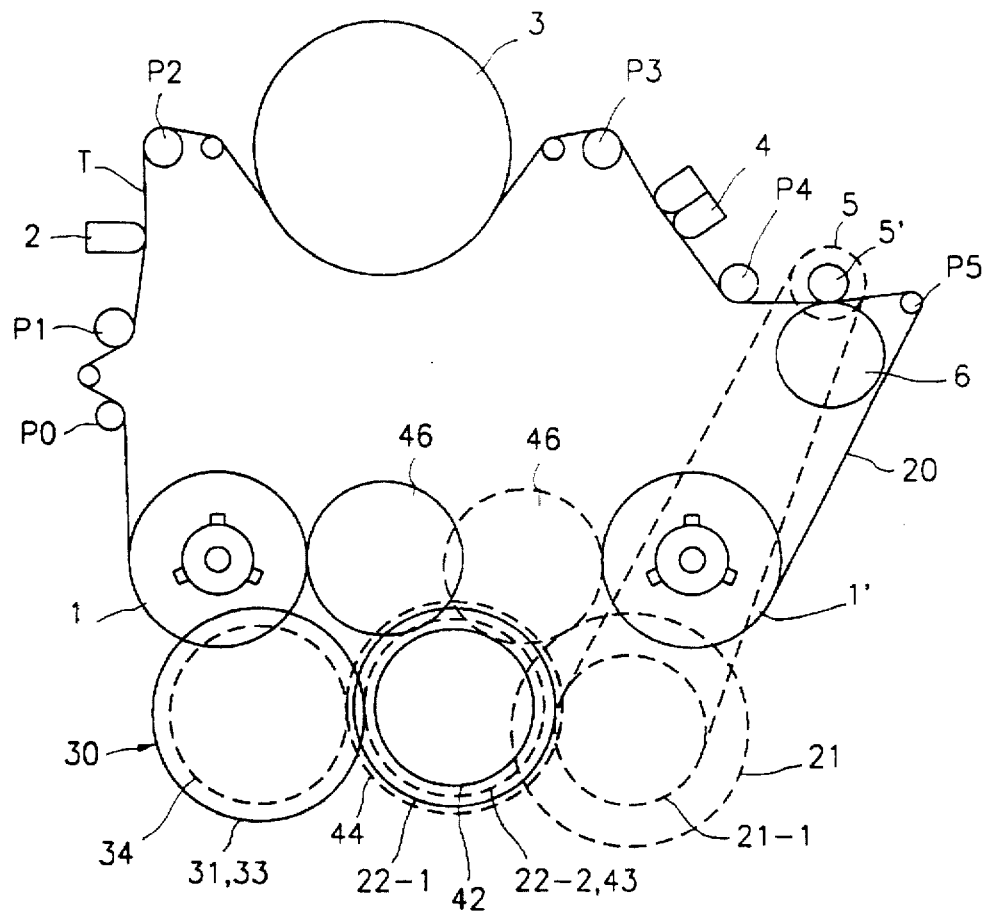
FIG. 4 is a plan view illustrating a tape running system and a reel driving apparatus for a magnetic recording and reproducing apparatus according to the present invention.
Figure 5:
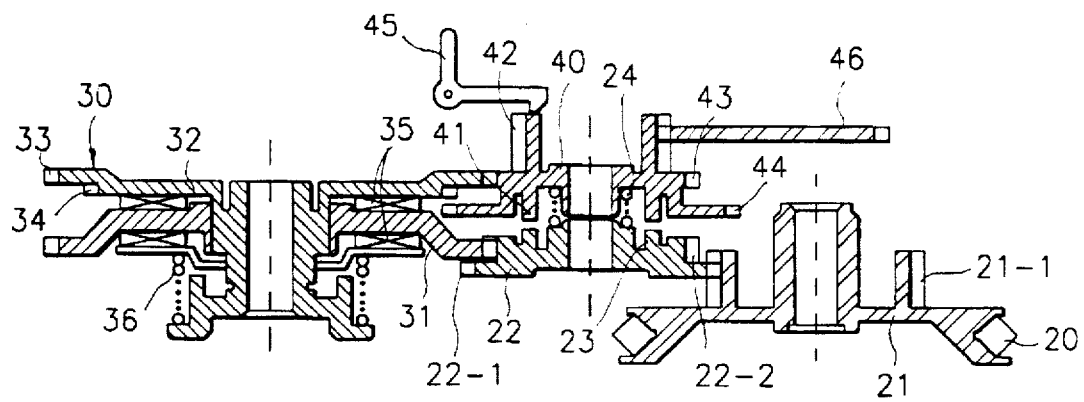
FIG. 5 is a cross-sectional view illustrating a reel driving apparatus in the normal direction rotation mode according to the present invention.
Figure 6:
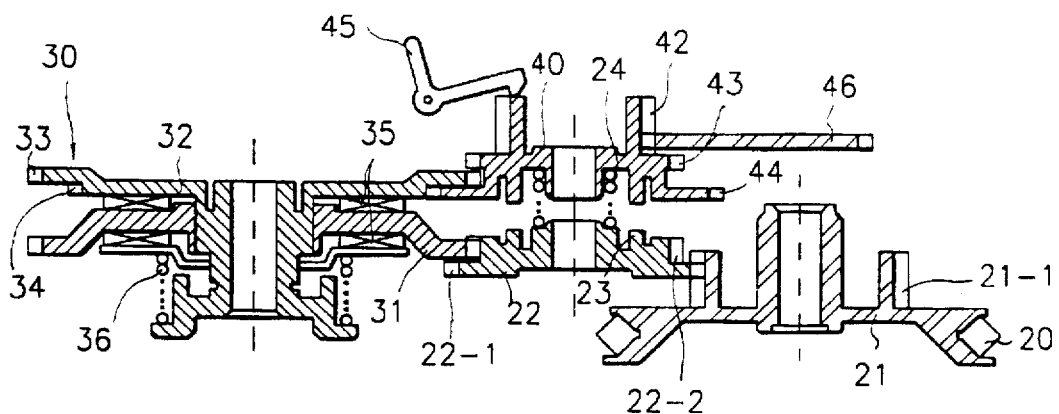
FIG. 6 is a cross-sectional view illustrating a reel driving apparatus in the reverse direction rotation mode according to the present invention.
Figure 7:
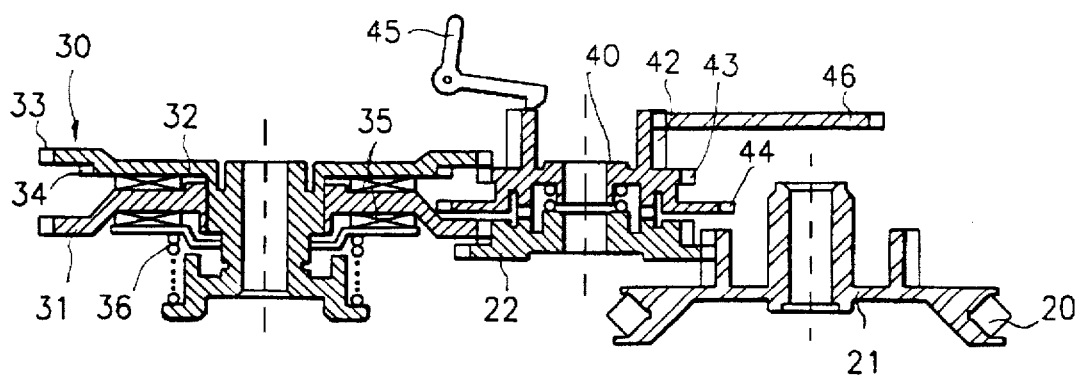
FIG. 7 is a cross-sectional view illustrating a reel driving apparatus in the fast winding mode according to the present invention.

FIG. 4 is a plan view illustrating a tape running system and a reel driving apparatus for a magnetic recording and reproducing apparatus according to the present invention, FIG. 5 is a cross-sectional view illustrating a reel driving apparatus in the normal direction rotation mode, FIG. 6 is a cross-sectional view illustrating a reel driving apparatus in the reverse direction rotation mode, and FIG. 7 is a cross-sectional view illustrating a reel driving apparatus in the fast winding mode.

As shown therein, a reversible motor (not shown) is disposed in a main base 5, and a pulley 21 having a pulley gear 21-1, which is driven by the rotation force of the motor through a belt 20, is disposed in the main base 5.

A first gear 22-1 of a transmission gear 22 engaged to a shaft (not shown) between a supply reel 1 and a take-up reel 1' on the main base is intermeshed with a pulley gear 21-1 driven by the rotation force of the motor. An engaging protrusion 23 is formed on the upper surface of the transmission gear 22.

A slip mechanism 30 is disposed for transferring a constant torque in cooperation with the driving force of the motor, which force is transferred thereto through the transmission gear 22.

The slip mechanism 30 includes an input gear 31 intermeshed with a second gear 22-2 of the transmission gear 22, and an output gear 32 which is coaxially rotatable between the input gear 31 and a friction member 35.

The output gear 32 includes a normal direction gear 33 and a reverse direction gear 34 having different diameters. The diameters of the output gear 32 and the normal direction gear 33 are different for transferring the different torques to the reels in the normal and reverse direction rotation modes. So, the diameter of the normal direction gear 33 is greater than that of the reverse direction gear 34.

In addition, a lifting and lowering gear 40 is coaxially arranged with respect to the transmission gear 22. An elastic member 24 is disposed between the lifting and lowering gear 40 and the transmission gear 22 for providing elastic force to the driving operation of the lifting and lowering gear 40, which will be explained later. In addition, an engaging protrusion 41 formed in the lower surface of the lifting and lowering gear 40 is engaged with the engaging protrusion 23 formed in the upper surface of the transmission gear 22.

The lifting and lowering gear 40 includes a normal direction gear 43 intermeshed with the normal direction gear 33 of the output gear 32, and a reverse direction gear 44 intermeshed with the reverse direction gear 34 of the output gear 32. The normal direction gear 43 of the lifting and lowering gear 40 has smaller diameter than the reverse direction gear 44. In addition, when the normal direction gear 43 of the lifting and lowering gear 40 is intermeshed with the normal direction gear 33 of the output gear 32, the reverse direction gear 44 of the lifting and lowering gear 40 is not intermeshed with the reverse direction gear 34 of the output gear 32. On the contrary, when the normal direction gear 43 of the lifting and lowering gear 40 is not intermeshed with the normal direction gear 33 of the output gear 32, the reverse direction gear 44 of the lifting and lowering gear 40 is intermeshed with the reverse direction gear 34 of the output gear 32. Therefore, the lifting and lowering operation of the lifting and lowering gear 40 is performed by a lifting and lowering member 45.

In addition, a driving gear 42 is disposed on the upper portion of the lifting and lowering gear 40 for driving an idler gear 46. The driving gear 42 has lengthy portion for thus being always intermeshed with the gear portion of the idler gear 46 even when the lifting and lowering gear 40 is lifted and lowered by the lifting and lowering member 45.

A lifting and lowering member 45 is disposed for lifting and lowering the lifting and lowering gear 40 for selectively connecting the normal and reverse direction gears 33 and 34 of the output gear 32 with one of the gear 43 and 44 of the lifting and lowering gear 40. The lifting and lowering member 45 is driven by a driving member (not shown). The driving force transmission for changing the operation mode is not limited to the scopes disclosed in the drawings.

In the drawings, reference numeral 36 denotes an elastic member.

The operation of the reel driving apparatus for a magnetic recording and reproducing apparatus according to the present invention will now be explained.

First, in the reproducing mode (PLAY and CUE modes) as shown in FIG. 5, the normal direction gear 33 of the output gear 32 is intermeshed with the normal direction gear 43 of the lifting and lowering gear 40 by the lifting and lowering member 45, and the pulley 21 is rotated by the driving motor, and the transmission gear 22 intermeshed with the pulley 21 is rotated and transfers driving force to the input gear 31 of the slip mechanism 30. In the slip mechanism 30, the rotational force of the input gear 31 is transferred to the output gear 32. The lifting and lowering gear 40 intermeshed with the normal direction gear 33 of the output gear 32 is rotated by the normal direction gear 43 of the lifting and lowering gear 40, and the driving gear 42 of the lifting and lowering gear 40 drives the idler gear 46 and the take-up reel 1', for thus performing the reproducing mode. As described above, in the reproducing mode, the motor is rotated in the counterclockwise direction, and the take-up reel 1' is rotated in the clockwise direction, for thus winding the tape. So, since the take-up reel 1' is driven by a small amount of driving torque, the above-described driving force transferring operation is properly performed.

In addition, the reverse direction reproducing mode (REV) will now be explained with reference to FIG. 6.

First, the lifting and lowering gear 40 is driven by the lifting and lowering member 45, and the reverse direction gear 44 of the lifting and lowering gear 40 is intermeshed with the reverse direction gear 34 of the output gear 32. In the above-described state, the clockwise direction driving force is transferred to the pulley gear 21-1, the transmission gear 22, the input gear 31, and the output gear 32 in order, and the reverse direction gear 34 of the output gear 32 is intermeshed with the reverse direction gear 44 of the lifting and lowering gear 40, for thus driving the idler gear 46. The supply reel 1 is rotated by the idler gear 46 in the counterclockwise direction, for thus performing the reverse direction reproducing mode. Generally, since the reverse direction reproducing mode needs more driving torque than the normal direction reproducing mode, the above-described driving force transferring paths are formed.

The difference between the reproducing mode and the reverse reproducing mode is that in the reverse direction reproducing mode, it is possible to obtain a desired slowing-down operation compared to the reproducing mode during the driving force transfer from the transmission gear 22 to the lifting and lowering gear 40, for thus obtaining high torque.

In addition, the fast winding (FF/REW) mode will now be explained with reference to FIG. 7.

In the fast winding (FF/REW) mode, the tape is run at high speed. The lifting and lowering gear 40 is integrally driven together with the transmission gear 22 by the lifting and lowering member 45. Namely, the engaging protrusion 41 formed in the lower surface of the lifting and lowering gear 40 is engaged with the engaging protrusion 23 formed in the upper surface of the transmission gear 22, and the lifting and lowering gear 40 and the transmission gear 22 are integrally driven, for thus the driving force is transferred from the transmission gear 22 to the lifting and lowering gear 40. Therefore, the driving force is transferred from the motor to the pulley gear 21-1, the transmission gear 22, the lifting and lowering gear 40, and the idler gear 46 in order, for thus rotating the reels.

There are three driving force transfer paths between the transmission gear 22 and the lifting and lowering gear 40.

Namely, there are a first rotation force transfer path in which the rotational force is directly transferred from the transmission gear 22 to the lifting and lowering gear 40, a second rotation force transfer path in which the rotational force is transferred from the transmission gear 22 to the lifting and lowering gear 40 through the slip mechanism 30, for thus transferring torque to the idler gear 46, and a third rotation force transfer path in which the rotational force is transferred from the transmission gear 22 to the lifting and lowering gear 40 through the slip mechanism 30, for thus transferring a torque from the second rotation force transfer path and another torque to the idler gear 46.

Here, the first rotation force transfer path is related to the fast winding mode, and the second and third rotation force transfer paths are related to the normal direction reproducing and reverse direction reproducing modes, respectively. The reverse direction reproducing mode needs more driving torque for driving the supply reel than the reproducing mode for driving the take-up reel.

As described above, the reel driving apparatus for a magnetic recording and reproducing apparatus according to the present invention is basically directed to providing the output gear and the lifting and lowering gear with a normal direction gear and a reverse direction gear, of the slip mechanism, respectively, which normal and reverse direction gears have different diameters. Therefore, in the reverse and normal direction reproducing modes, it is possible to provide different torques for driving the supply reel and the take-up reel, so that an additional gear for providing different torques in the conventional art is not needed.

Furthermore, it is possible to reduce the number of parts and simplify the construction of the system, for thus reducing the fabrication cost, whereby it is possible to enhance the reliability of the product.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A reel driving apparatus for a magnetic recording and reproducing apparatus, comprising:

a reversible motor;

a transmission gear which is inserted onto a shaft between a supply reel and a take-up reel and is rotatable by a rotational force from the reversible motor;

a slip mechanism having an input gear drivingly connected with the transmission gear and an output gear having a pair of gear portions, with the output gear receiving the rotational force from the input gear through a friction member;

a lifting and lowering gear having a pair of gear portions, which are selectively connected with the gear portions of the output gear by a lifting and lowering means, and being rotated, lifted, and lowered with respect to the shaft; and an idler gear which is always connected with the lifting and lowering gear for selectively transferring a rotational force from the lifting and lowering gear to one of supply and take-up reels.

2. The apparatus of claim 1, wherein said gear portions formed in the output gear have different diameters.

3. The apparatus of claim 2, wherein said gear portions formed in the output gear are rotated in different directions.

4. The apparatus of claim 1, wherein said gear portions formed in the lifting and lowering gear have different diameters.

5. The apparatus of claim 4, wherein said gear portions formed in the lifting and lowering gear are rotated in different directions.

6. A reel driving apparatus for a magnetic recording and reproducing apparatus, comprising:

a reversible motor;

a transmission gear which is inserted onto a shaft between a supply reel and a take-up reel and is rotatable by a rotatable force from the reversible motor;

a slip mechanism having an input gear drivingly connected with the transmission gear and an output gear having a large diameter gear portion and a small diameter gear portion, with an output gear receiving the rotational force from the input gear through a friction member;

a lifting and lowering gear having the large diameter gear portion which is connected with the small diameter gear portion of the output gear and the small diameter gear portion which is connected with the large diameter gear portion of the output gear by a lifting and lowering means, and being rotated, lifted, and lowered with respect to the shaft; and an idler gear which is always connected with the lifting and lowering gear for selectively transferring a rotational force from the lifting and lowering gear to one of supply and take-up reels.

7. A reel driving apparatus for a magnetic recording and reproducing apparatus, comprising:

a reversible motor;

a transmission gear which is rotatable by the reversible motor;

a lifting and lowering gear inserted onto a shaft disposed between a supply reel and a take-up reel;

an idler gear for transferring a rotation force to the supply reel and the take-up reel; and a path change means for selecting one from first, second, and third rotation force transfer paths in which the transfer driving force is different, respectively, in accordance with the operation mode and for directly or indirectly transferring a rotational force from the transmission gear to the lifting and lowering gear.

8. The apparatus of claim 7, wherein said path change means includes:

a connection member for being selectively and directly connected between the transmission gear and the lifting and lowering gear; and a slip mechanism for being indirectly connected between the transmission gear and the lifting and lowering gear, wherein said slip mechanism includes an input gear intermeshed with the transmission gear, and an output gear for transferring the rotational force from the input gear to the lifting and lowering gear.

9. The apparatus of claim 8, wherein said lifting and lowering gear includes a pair of coaxial gear portions having different diameters.

10. The apparatus of claim 8, wherein said output gear includes a pair of coaxial gear portions having different diameters.

11. The apparatus of claim 8, wherein said first rotation force transfer path is formed to directly transfer a rotational force from the transmission gear to the lifting and lowering gear, said second rotation force transfer path is formed to transfer a rotational force from the transmission gear to the lifting and lowering gear through the slip mechanism, for thus transferring a driving torque to the idler gear, and said third rotation force transfer path is formed to transfer a rotational force from the transmission gear to the lifting and lowering gear through the slip mechanism, for thus transferring a torque from the second rotation force transfer path and another torque to the idler gear.

* * * * *